United States Patent
Tomotaki et al.

(10) Patent No.: US 6,433,042 B1
(45) Date of Patent: *Aug. 13, 2002

(54) CURING AGENTS FOR EPOXY RESINS

(75) Inventors: Yoshihisa Tomotaki; Takashi Kitajima; Keiichiro Ishikawa; Akihiro Nabeshima; Tomohiro Furuichi, all of Tokushima-ken (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/774,187
(22) PCT Filed: Sep. 28, 1999
(86) PCT No.: PCT/JP99/05267
§ 371 (c)(1), (2), (4) Date: Feb. 5, 2001
(87) PCT Pub. No.: WO00/18818
PCT Pub. Date: Apr. 6, 2000

(30) Foreign Application Priority Data

Sep. 29, 1998 (JP) ............................................. 10-294546

(51) Int. Cl.[7] .............................. C08K 3/20; C08L 63/02
(52) U.S. Cl. ..................... 523/404; 528/94; 528/116; 528/117; 528/118; 528/119; 523/423; 523/429
(58) Field of Search ................................. 523/404, 707, 523/410, 423, 429; 525/523; 528/94, 116, 117, 118, 119

(56) References Cited

U.S. PATENT DOCUMENTS 2,953,570 A  * 9/1960 Rudner
3,485,806 A  * 12/1969 Bloomquist
5,688,905 A    11/1997 Walker ....................... 528/332

FOREIGN PATENT DOCUMENTS

JP          59078231        7/1984

OTHER PUBLICATIONS

Leer Neville, *Handbook of Epoxy Resins*, McGraw–Hill pp. 5–4, 5–9, 5–12, Mar. 1967.*

Chem. Abstracts, Registry file print out, one page, 2001.*

* cited by examiner

*Primary Examiner*—Robert Dawson
*Assistant Examiner*—D. Aylward
(74) *Attorney, Agent, or Firm*—Arent Fox Kintner Plotkin & Kahn

(57) ABSTRACT

A curing agent for epoxy resin which comprises at least one selected from the compound of the formula (1) and its salt, as an effective component

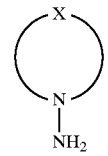

wherein X is $-(CH_2)_n-$ or $-(CH_2)_l-Y-(CH_2)_m-$, Y is $-N(R^1)-$, $-O-$ or $-S-$, $R^1$ is alkyl having 1 to 8 carbon atoms or amino. n is a number of 2, 3, 5 to 11, l and m are each a number of 1 to 8.

4 Claims, No Drawings

CURING AGENTS FOR EPOXY RESINS

This application is the National Stage Application of PCT/JP99/05267 filed Sep. 28, 1999.

TECHNICAL FIELD

The present invention relates to a curing agent for epoxy resin.

BACKGROUND ART

Epoxy resin is widely used as sealing material, coating composition, adhesive, etc, in a variety of fields such as electricity, electronics, and civil engineering and construction, because a cured product of epoxy resin has excellent electrical insulating properties, moisture proof, heat resistance, soldering resistance, chemical resistance, durability, adhesive property, and mechanical strength.

Conventionally, the curing of epoxy resin is carried out by adding a curing agent to epoxy resin, followed by heating. As typical representative examples of curing agent, there are, for example, diethylenetriamine, triethylenetetramine, isophoronediamine, diaminodiphenylmethane, diaminodiphenylsulfone, polyamides, dicyandiamide, hexahydrophthalic anhydride, methyltetrahydrophthalic anhydride, methyl nadic anhydride, novolac type phenol resin, tertiary amines, imidazoles, and amine complex of boron trifluoride.

Of these curing agents, ones which can cure epoxy resin at room temperature are amine curing agents such as diethylenetriamine, triethylenetetramine, polyamides, and tertiary amines. However, these curing agents require a long time of four to seven days for curing. It is difficult for other curing agents to be cured at room temperature, and they generally require a curing temperature of 80 to 200° C., and a curing time of 0.5 to 6 hours.

Meanwhile, an epoxy resin adhesive for outdoor construction is generally used in the field of civil engineering and construction. With a conventional curing agent, however, it is very difficult to cure epoxy resin without heating, as previously described. Even with one capable of curing, it takes an extremely long period of time, namely, four to seven days. Especially, for winter-season execution of works in which the outdoor temperature is often 10° C. and below, it is essential to initiate or promote the curing reaction by heating.

Such characteristic of epoxy resin adhesive prolongs the period of execution of works in civil engineering and construction, which is also one of the causes of interfering with labor saving.

Further, most of convention curing agents for epoxy resin have problems that curing ability decreases in the presence of water, a long time is required for curing, characteristics of cured product are greatly impaired, or cured product is not obtained. Therefore, in fact, use of curing agent is greatly limited in outdoor under rain or in shore-protection works.

An object of the present invention is to provide a curing agent for epoxy resin which can rapidly cure epoxy resin at ordinary temperature around 20° C. or a low temperatures in the range of near 0° C.

Another object of the present invention is to provide a curing agent for epoxy resin which is not disturbed in curing ability and even enhanced in curing velocity in the presence of water.

DISCLOSURE OF THE INVENTION

The present invention provides a curing agent for epoxy resin which comprises at least one selected from the compound of the formula (1) and its salt, as an effective component

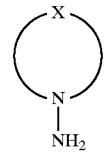

wherein X is —$(CH_2)_n$— or —$(CH_2)_l$-Y—$(CH_2)_m$— , Y is —$N(R^1)$—, —O— or —S—, $R^1$ is alkyl having 1 to 8 carbon atoms or amino, n is a number of 2, 3, 5 to 11, 1 and m are each a number of 1 to 8.

A curing agent for epoxy resin of the invention is capable of curing epoxy resin at low temperatures, of ordinary temperature or below, and, in some instances, at extremely low temperatures in the range of near −20°C. Thus, when an epoxy resin adhesive for outdoor is used, for example, in civil engineering and construction, the adhesive an be cured without applying heat, by using a curing agent for epoxy resin of the invention. This affords a great merit on working process.

The present curing agent for epoxy resin has an unexpected properties which is not impaired in curing ability even in the presence of water, but is enhanced in curing velocity with addition of a suitable amount of water. Thus, the present curing agent can preferably be used in outdoor or under water circumstances. Further, the present curing agent can be provided in the form of an aqueous solution or aqueous composition. The amount of water is usually up to 3, preferably 0.8 to 2 in terms of molar ratio of water/curing agent.

In $R^1$ of the formula (1) in the present invention, examples of alkyl having 1 to 8 carbon atoms are methyl, ethyl, propyl, butyl, hexyl and octyl. Examples of amino are $NH_2$ or those wherein one or two hydrogens of $NH_2$ are replaced by alkyl having 1 to 4 carbon atoms. Examples of alkyl having 1 to 4 carbon atoms are the same as above.

Examples of compounds of the formula (1) are 1-aminopiperidine, 1-aminohomopiperidine (AHP), 1-aminopiperazine, 1-amino-N'-methylpiperazine (AMPI), N,N'-diaminopiperazine, N-aminomorpholine (AMP), N-aminoaziridine (AAD), N-aminoazacycloundecene (AACU), N-aminothiomorpholine (ATMP) and 1-amino-4-octylpiperazine (AOPI).

Among these compounds particularly preferable are 1-aminohomopiperidine (AHP), 1-amino-N'-methylpiperazine (AMPI), N-aminomorpholine (AMP) and N-aminothiomorpholine (ATMP). Examples of salts of these compounds are hydrochloride, phosphate and sulfate.

Although the compound of the above formula (1) can be added directly, in the form of powder or liquid, to epoxy resin as a curing agent for epoxy resin. Alternatively, these are used in the form of an aqueous solution, organic solvent solution, or dispersion. Examples of organic solvent are lower alcohols such as methanol, ethanol and isopropanol; aromatic hydrocarbons such as toluene and xylene; aliphatic hydrocarbons such as hexane; ethers; polar solvent; and halogenated hydrocarbons. In addition, a solution of water and a suitable organic solvent or dispersion may be used. Of these various forms, an aqueous solution is particularly preferred.

The amount of curing agent for epoxy resin to be used to epoxy resin is not specifically limited. It may be suitably selected from a wide range, depending on various conditions such as the kind of epoxy resin, the kind and amount of other additives, the use of a cured product of epoxy resin to be obtained, and the curing conditions (the designed curing time and temperature, curing location, etc.). It is usually about 0.5 to 2 equivalents, preferably about 0.7 to 1.2 equivalents of epoxy group of the epoxy resin per equivalent of amine group of the effective compound.

Conventional curing agent and curing accelerator can be added, as required, to a curing agent for epoxy resin of the invention insofar as its preferred characteristic is not impaired. As a curing agent, the same various ones as mentioned in prior art are usable, and it is also possible to use melamine, methylolmelamine, resol type compound, etc. As a curing accelerator are used, for example, tertiary amines such as tri-n-butylamine, benzylmethylamine and 2,4,6-tris(dimethylaminomethyl)phenol; and imidazoles such as 2-methylimidazole, 2-ethylimidazole, 2-ethyl-4-methylimidazole and 2-phenylimidazole. These curing agents and curing accelerators can be used singly or in a combination of at least two of them.

Epoxy resin which can be cured with the curing agent of the invention is not specifically limited, and various epoxy resins are usable. Examples thereof are glycidyl ether type epoxy resin, glycidyl ester resin and glycidylamine type epoxy resin.

Examples of glycidyl ether type epoxy resin are bisphenol A type, bisphenol F type, brominated bisphenol A type, hydrogenated bisphenol A type, bisphenol S type, bisphenol AF type, biphenyl type, naphthalene type, fluorene type, phenol novolac type, cresol novolac type, DPP novolac type, trifunctional type, tris(hydroxyphenyl)methane type, and tetraphenylolethane type epoxy resins.

Examples of glycidyl ester type epoxy resin are hexahydrophthalate type and phthalate type epoxy resins.

Examples of glycidylamine type epoxy resin are tetraglycidyldiaminodiphenylmethane, triglycidyl isocyanurate, hydantoin type, 1,3-bis(N,N-diglycidylaminomethyl)cyclohexane, aminophenol type, aniline type, and toluidine type epoxy resins.

To epoxy resin can be added, as required, a filler and reinforcing agent, which have conventionally been added to epoxy resin. Examples of fillers are silica, fused quartz, calcium carbonate, barium carbonate, barium sulfate, alumina hydrate, alumina, magnesia hydrate, zircon, cordierite, silicon nitride, boron nitride, and aluminum nitride. Examples of reinforcing agents are talc, mica, glass fiber, potassium titanate fiber, titanium dioxide fiber, wallastonite, xonotlite, zinc silicate fiber, aramide fiber, carbon fiber and boron fiber. It is possible to suitably change the kind, amount or the like of a filler and reinforcing agent in order to obtain desired properties of a cured epoxy resin product. Usually, it is suitable to add about 20 to 160 parts by weight of a filler and reinforcing agent, preferably about 50 to 120 parts by weight, based on 100 parts by weight of epoxy resin. Filler and reinforcing agent may be used singly or in a combination of at least two of them.

Further, various additives may be added as required to the above epoxy resin composition. Examples of such additives are inorganic pigment (particulate titanium dioxide, carbon black, red iron oxide, yellow iron oxide, etc.), organic pigment, viscosity adjusting agent, leveling agent, antifoamer, coupling agent, plasticizer, diluent, flame retardant (magnesium hydroxide, aluminum hydroxide, antimony oxide, alkyl phosphates or phosphazenes), and organic solvent. The above epoxy resin composition is applicable to coat, bond, or repair materials such as metal, synthetic resin, cement, ceramics, knitting or fabric of inorganic or organic fiber (glass cross, etc.) and papers, or to prepare a shaped product using the composition. Specifically, an article of various shape may be dipped in the epoxy resin composition, alternatively, the epoxy resin composition is applied or coated to the article surface, or poured into the article or filled into opening between articles, and then allowed to stand as it is, for curing. When curing, heating is not required particularly, but it is possible to heat to about 40 to 120° C. as required depending on the composition.

Also, the above epoxy resin composition can be formed into a shaped product of a desired shape, in accordance with the usual molding method, e.g., casting molding and injection molding.

BEST MODE OF CARRYING OUT THE INVENTION

The present invention will be described in more detail with reference to the following examples to which, however, the invention is not limited.

EXAMPLE 1

An epoxy resin composition was obtained by mixing equivalent amounts of a compound listed in Table 1 and an epoxy resin (Epikote 828, epoxy equivalent: 190). About 3 g of the obtained epoxy resin composition was weighed out with an aluminum cup. This was then allowed to stand at room temperature to observe the cured state every prescribed hour. Table 1 gives the results.

EXAMPLE 2

An epoxy resin composition was obtained by mixing equivalent amounts of a compound listed in Table 1 having an equivalent amount of water added therein, and an epoxy resin (Epikote 828, epoxy equivalent: 190). About 3 g of the obtained epoxy resin composition was weighed out with an aluminum cup. This was then allowed to stand at room temperature to observe the cured state every prescribed hour. Table 1 gives the results.

EXAMPLE 3

An epoxy resin composition was obtained by mixing equivalent amounts of a compound listed in Table 2 and an epoxy resin (Epikote 828, epoxy equivalent: 190). About 3 g of the obtained epoxy resin composition was weighed out with an aluminum cup. This was then allowed to stand at 0° C. to observe the cured state every prescribed hour. Table 2 gives the results.

EXAMPLE 4

An epoxy resin composition was obtained by mixing equivalent amounts of a compound listed in Table 2 having an equivalent amount of water added therein, and an epoxy resin (Epikote 828, epoxy equivalent: 190). About 3 g of the obtained epoxy resin composition was weighed out with an aluminum cup. This was then allowed to stand at 0° C. to observe the cured state every prescribed hour. Table 2 gives the results.

TABLE 1

| Compound | water | (minutes) | | | (hour) | | | | | |
|---|---|---|---|---|---|---|---|---|---|---|
| | | 5 | 10 | 20 | 1 | 3 | 5 | 8 | 12 | 24 |
| AHP | added | Δ | ○ | | | | | | | |
| | none | | | | Δ | ○ | | | | |
| AMPI | added | | | | Δ | ○ | | | | |
| | none | | | | | | | Δ | | ○ |
| AMP | added | | | Δ | ○ | | | | | |
| | none | | | | | | | Δ | ○ | |

Δ: sample has gelled
○: sample has cured
get,0001
get,0002
get,0003

TABLE 2

| compound | water | (hour) | | |
|---|---|---|---|---|
| | | 4 | 11 | 18 |
| AHP | added | Δ | ○ | |
| | none | | Δ | ○ |

EXAMPLES 5 TO 8

An epoxy resin composition was obtained by mixing equivalent amounts of a compound listed below and an epoxy resin (Epikote 828, epoxy equivalent: 190). About 3 g of the obtained epoxy resin composition was weighed out with an aluminum cup. This was then allowed to stand at room temperature to observe the cured state. Table 3 gives the results. Further, an epoxy resin composition was cured at room temperature in the same manner as above except of using the compound having an equivalent amount of water added therein. Table 3 also gives the results.

N-Aminoaziridine (AAD)
N-Aminoazacycloundecene (AACU)
N-Aminothiomorpholine (ATMP)
1-Amino-4-octylpiperazine (AOPI)

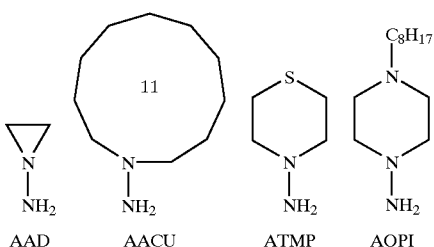

TABLE 3

| compound | water | gel time | curing time |
|---|---|---|---|
| AAD | added | 20 min. | 40 min. |
| | none | 40 min. | 90 min. |
| AACU | added | 3 hour | 5 hour |
| | none | 8 hour | 14 hour |
| ATMP | added | 30 min. | 1 hour |
| | none | 4 hour | 11 hour |
| AOPI | added | 3 hour | 6 hour |
| | none | 10 hour | 40 hour |

INDUSTRIAL APPLICABILITY

In accordance with the present invention, it is possible to obtain a curing agent for epoxy resin which can rapidly cure epoxy resin at ordinary temperature around 20° C. or a low temperatures in the range of near 0° C.

In addition, the curing agent for epoxy resin of the invention has an excellent effect that the curing ability is not disturbed and even the curing velocity is further enhanced in the presence of water.

What is claimed is:

1. A curing agent for epoxy resin which comprises at least one selected from the compound of the formula (1) and its salt, as an effective component Formula (I)

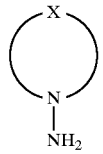

wherein X is —$(CH_2)$n- or $(CH_2)$l-Y—$(CH_2)$m- , Y is —N($R^1$)—, —O— or —S—, $R^1$ is alkyl having 1 to 8 carbon atoms or amino, n is a number of 2, 3, 5 to 11, l and m are each a number of 1 to 8.

2. A curing agent as defined in claim 1 wherein the compound of formula (1) is 1-aminohomopiperidine, 1-amino-N'-methylpiperazine, N-aminomorpholine or N-aminothiomorpholine.

3. A curing agent for epoxy resin which comprises at least one selected from the compound of the formula (1) and its salt, as an effective component, which is used in the presence of water.

Formula (I)

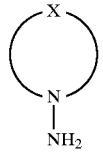

4. A method of hardening an epoxy resin comprising curing the epoxy resin by use of the curing agent of claim 1 with the presence of water.

* * * * *